(12) United States Patent
Suzuki et al.

(10) Patent No.: US 10,155,491 B2
(45) Date of Patent: Dec. 18, 2018

(54) ELECTRIC POWER SUPPLY DEVICE

(71) Applicant: TOYOTA JIDOSHA KABUSHIKI KAISHA, Toyota-shi, Aichi-ken (JP)

(72) Inventors: Takeaki Suzuki, Susono (JP); Michihiro Miyashita, Susono (JP); Kazuhito Eshima, Susono (JP); Hiroshi Nate, Toyota (JP); Sunao Horitake, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 480 days.

(21) Appl. No.: 14/819,869

(22) Filed: Aug. 6, 2015

(65) Prior Publication Data

US 2016/0039370 A1    Feb. 11, 2016

(30) Foreign Application Priority Data

Aug. 6, 2014   (JP) .................. 2014-160425
Oct. 21, 2014  (JP) .................. 2014-214201

(51) Int. Cl.
*B60R 16/033*       (2006.01)
*B60W 10/00*        (2006.01)
(Continued)

(52) U.S. Cl.
CPC .......... *B60R 16/033* (2013.01); *B60L 1/00* (2013.01); *B60L 3/003* (2013.01); *B60L 3/0046* (2013.01); *B60L 7/26* (2013.01); *B60L 11/1809* (2013.01); *B60L 11/1868* (2013.01); *B60L 15/2009* (2013.01); *B60W 10/00* (2013.01); *Y02T 10/645* (2013.01); *Y02T 10/7011* (2013.01); *Y02T 10/7016* (2013.01); *Y02T 10/7066* (2013.01); *Y02T 10/7275* (2013.01)

(58) Field of Classification Search
None
See application file for complete search history.

(56) References Cited

U.S. PATENT DOCUMENTS 6,452,286 B1    9/2002  Kubo et al.
2002/0142884 A1 10/2002 Kitajima et al.
(Continued)

FOREIGN PATENT DOCUMENTS

CN    103620911 A    3/2014
EP    1401082 A2     3/2004
(Continued)

*Primary Examiner* — Jared Fureman
*Assistant Examiner* — James Evans
(74) *Attorney, Agent, or Firm* — Sughrue Mion, PLLC (57) ABSTRACT

An electric power supply device includes first and second batteries respectively supplying electric power to a plurality of load instruments mounted on a vehicle, an electric power generator capable of charging the first battery and the second battery by regenerative electric power generation, and control means for controlling the electric power generator so that a charging electric power amount of at least one of the first battery and the second battery based on the regenerative electric power generation is suppressed in a case where at least one of a high-load instrument and a backup target instrument is present among the plurality of load instruments and the electric power generator is performing the regenerative electric power generation during the deceleration of the vehicle.

7 Claims, 8 Drawing Sheets (51) Int. Cl.
*B60L 1/00* (2006.01)
*B60L 15/20* (2006.01)
*B60L 11/18* (2006.01)
*B60L 3/00* (2006.01)
*B60L 7/26* (2006.01)

(56) References Cited

U.S. PATENT DOCUMENTS

| | | | | |
|---|---|---|---|---|
| 2005/0099160 A1* | 5/2005 | Asaumi | ............... | H02J 7/0019 320/132 |
| 2013/0264868 A1* | 10/2013 | Higaki | ............... | H02J 7/345 307/10.1 |
| 2014/0111145 A1* | 4/2014 | Mitsuda | ............... | B60L 11/14 320/107 |
| 2014/0257636 A1* | 9/2014 | Ueki | ............... | F02D 29/02 701/36 |
| 2014/0265560 A1* | 9/2014 | Leehey | ............... | B60L 1/003 307/10.1 |
| 2015/0035356 A1 | 2/2015 | Sakata | | |
| 2015/0291039 A1 | 10/2015 | Sakata et al. | | |

FOREIGN PATENT DOCUMENTS

| | | |
|---|---|---|
| EP | 1 531 536 A2 | 5/2005 |
| JP | 2001078306 A | 3/2001 |
| JP | 2005145097 A | 6/2005 |
| JP | 2006087163 A | 3/2006 |
| JP | 2010-115055 A | 5/2010 |
| JP | 2011-178384 A | 9/2011 |
| JP | 2011-234536 A | 11/2011 |
| JP | 2012-035756 A | 2/2012 |
| JP | 2012-249381 A | 12/2012 |
| JP | 2013190990 A | 9/2013 |
| JP | 5546649 B2 | 7/2014 |
| WO | 2012098708 A1 | 7/2012 |
| WO | 2013/141196 A1 | 9/2013 |
| WO | 2014/068918 A1 | 5/2014 |

* cited by examiner

ELECTRIC POWER SUPPLY DEVICE

INCORPORATION BY REFERENCE

The disclosure of Japanese Patent Application No. 2014-160425 and 2014-214201 filed on Aug. 6, 2014 and Oct. 21, 2014 including the specification, drawings and abstract is incorporated herein by reference in its entirety.

BACKGROUND OF THE INVENTION

1. Field of the Invention

The invention relates to a technical field covering an electric power supply device that is provided with a battery which is charged by an electric power generator mounted on a vehicle and supplies electric power to a plurality of load instruments mounted on the vehicle.

2. Description of Related Art

As an example of this type of device, a device has been proposed in which an electric power storage device is connected to an electric power generator via a DC/DC converter and a rectifier so that a change in electric power generated by the electric power generator does not affect the service life of the electric power storage device and the electric power generated by the electric power generator can be changed to a large extent while a reduction in the service life of the electric power storage device is inhibited (refer to Japanese Patent Application Publication No. 2012-249381 (JP 2012-249381 A)).

As another example, a device has been proposed in which a battery and a capacitor are provided and the battery and the capacitor are electrically connected in series to each other in a case where the voltage of the battery is reduced to or below a threshold due to a large load acting thereon (refer to Japanese Patent Application Publication No. 2012-035756 (JP 2012-035756 A)).

SUMMARY OF THE INVENTION

The technique described in JP 2012-249381 A does not take into account a charging voltage for the electric power storage device. Accordingly, a technical problem arises as the electric power storage device may be subjected to degradation in a case where the electric power storage device is charged at a relatively high charging voltage.

In a vehicle on which a large-load instrument such as a power steering device is mounted, for example, the charging and discharging of the battery are performed relatively frequently due to the operation of the large-load instrument. Then, the degradation of the battery may be accelerated to pose a technical problem. With the technique described in JP 2012-035756 A, this technical problem is unlikely to be addressed.

The invention provides an electric power supply device that is capable of appropriately inhibiting battery degradation.

According to an aspect of the invention, there is provided an electric power supply device for a vehicle. A plurality of load instruments are mounted on the vehicle. The electric power supply device includes a first battery, a second battery, an electric power generator, and an ECU. The first battery and the second battery are configured to supply electric power to the load instruments. The electric power generator is configured to charge the first battery and the second battery by regenerative electric power generation for converting kinetic energy into electric energy. The ECU is configured to control the electric power generator so that a charging electric power amount of at least one of the first battery and the second battery based on the regenerative electric power generation is suppressed when a specific instrument is present among the plurality of load instruments and the electric power generator is performing the regenerative electric power generation during the deceleration of the vehicle. The specific instrument is an instrument affecting the traveling of the vehicle when a supplied voltage is unstable.

According to the aspect of the invention, the electric power supply device is provided with the first battery, the second battery, the electric power generator, and the ECU.

The first battery and the second battery are mounted on the vehicle and respectively supply the electric power to the plurality of load instruments which are electrical components such as a light, a power steering device, an electric stabilizer, and the electronic control unit (ECU). Various known types of batteries, such as a lead battery, a nickel-hydrogen battery, and a lithium-ion battery, can be used as the first battery and the second battery.

The electric power generator is configured to be capable of charging the first battery and the second battery by the regenerative electric power generation. Examples of the regenerative electric power generation include a technique for generating electric power by operating an electric power generator by means of tire rotation and a technique for recovering the rotary power of an engine as electric energy. Also, the electric power generator may be an electric power generator realized in a motor generator (electrically-driven electric power generator). In other words, the electric power generator may mean a motor generator used in, for example, a hybrid vehicle insofar as functioning as an electric power generator is available.

The ECU, which is provided with, for example, a memory and a processor, controls the electric power generator so that the charging electric power amount of at least one of the first battery and the second battery based on the regenerative electric power generation is suppressed in a case where the instrument affecting the traveling of the vehicle when the supplied electric power is unstable is present among the plurality of load instruments and the electric power generator is performing the regenerative electric power generation during the deceleration of the vehicle.

Herein, the "instrument affecting the traveling of the vehicle when the supplied electric power is unstable" is a concept covering an instrument with relatively large electric power consumption such as an electric active stabilizer, an electric power steering, an anti-lock brake system (ABS)/vehicle stability control (VSC) actuator, an electronic control brake (ECB), and an electric supercharger and an instrument requiring electric power supply backup such as a by-wire system (shift-by-wire, steer-by-wire, brake-by-wire, and the like) and an auto drive/drive assist system (a camera, a millimeter wave, a radar, a vehicle-mounted communication instrument, a door lock, and the like).

The "electric power generator performing the regenerative electric power generation during the deceleration of the vehicle" is a concept not limited to so-called regenerative braking but covering, for example, generating electric power by operating the electric power generator at a high load by means of engine rotation during the deceleration of the vehicle.

Research conducted by the inventor of the present application has revealed the followings. In a case where the instrument with the relatively large electric power consumption is mounted on the vehicle, the electric power is supplied to each of the plurality of load instruments from the plurality of batteries (the "first battery" and the "second battery" in the invention) in view of voltage stabilization. During the deceleration of the vehicle, fuel efficiency improvement is pursued by means of the charging of the plurality of batteries based on the regenerative electric power generation.

In order to increase the effect of the fuel efficiency improvement, it is desirable to relatively heighten the electric power generation voltage of the regenerative electric power generation. However, the batteries may be degraded relatively early as, for example, the charging and discharging of the batteries become increasingly frequent. The degradation of the batteries makes it impossible to stably supply the electric power to the load instruments or makes the electric power supply become insufficient when electric power supply backup is required. In this case, the traveling of the vehicle may be affected.

According to the aspect of the invention, the ECU controls the electric power generator so that the charging electric power amount of at least one of the first battery and the second battery based on the regenerative electric power generation is suppressed in a case where the instrument affecting the traveling of the vehicle when the supplied electric power is unstable is present and the electric power generator is performing the regenerative electric power generation during the deceleration of the vehicle as described above.

Accordingly, the stress to which the batteries are subjected as a result of, for example, the charging can be inhibited and the degradation of the batteries can be inhibited. When the degradation of the batteries is inhibited, electric power can be appropriately supplied to the instrument with the relatively large electric power consumption when the instrument is in operation or electric power can be appropriately supplied to the instrument requiring the electric power supply backup when the electric power supply backup is required.

According to the aspect of the invention, the charging electric power amount during the deceleration of the vehicle is suppressed, and thus a stable load instrument operation can be ensured over a long period of time (for example, for years) based on the inhibition of the battery degradation although the effect of the fuel efficiency improvement is reduced in the short term (for example, during the deceleration period) in comparison to a case where the charging electric power amount is not suppressed. In addition, the invention allows the fuel efficiency to be improved in comparison to a case where the electric power generation voltage of the electric power generator remains constant (for example, at 12 V) for the inhibition of the battery degradation, which leads to significant practical advantages.

As a result of the above, the fuel efficiency can be improved while the battery degradation is inhibited according to the electric power supply device of the invention.

In the aspect described above, the specific instrument may be a backup target instrument. The backup target instrument is an instrument requiring support for stabilizing the voltage supplied to the instrument.

According to this aspect, stable electric power supply can be performed on the backup target instrument over a relatively long period of time while the battery degradation is inhibited. Accordingly, the stability of the vehicle can be improved, which leads to significant practical advantages.

In the aspect described above, the specific instrument may be a high-load instrument with reference electric power consumption equal to or greater than a threshold.

According to this aspect, electric power can be appropriately supplied to the high-load instrument while the battery degradation is inhibited. Accordingly, the high-load instrument can be stably operated over a relatively long period of time and the marketability of the vehicle on which the electric power supply device is mounted can be improved.

The "high-load instrument" relating to the aspect of the invention means a load instrument with reference electric power consumption equal to or greater than a threshold. Herein, the "threshold" may be set as reference electric power consumption in which the effect on another load instrument corresponds to the maximum value of the degree of allowable voltage reduction based on, for example, an obtained relationship between the reference electric power consumption and the degree of temporary voltage reduction or reference electric power consumption which is lower by a predetermined value than the reference electric power consumption.

In the aspect described above, the ECU may be configured to control the electric power generator for a voltage lower than at least one of a first electric power generation voltage, a second electric power generation voltage, and a third electric power generation voltage when the specific instrument is present and the electric power generator is performing the regenerative electric power generation during the deceleration of the vehicle. The first electric power generation voltage is the electric power generation voltage of the electric power generator available when the specific instrument is present and the electric power generator is performing the regenerative electric power generation without causing regenerative control. The second electric power generation voltage is the electric power generation voltage of the electric power generator available when the specific instrument is absent and the electric power generator is performing the regenerative electric power generation during the deceleration of the vehicle. The third electric power generation voltage is the electric power generation voltage of the electric power generator available when the specific instrument is absent and the electric power generator is performing the regenerative electric power generation without causing the regenerative control.

According to this aspect, the charging electric power amount during the deceleration of the vehicle on which the instrument affecting the traveling of the vehicle when the supplied electric power is unstable is mounted can be relatively easily suppressed, which leads to significant practical advantages.

The "regenerative control" means a technique for controlling the electric power generation voltage of the electric power generator (for example, controlling an increase and a decrease in the electric power generation voltage) and improving the fuel efficiency by decreasing fuel consumption by the engine by, for example, suppressing electric power generation by the electric power generator to the minimum level required. The "electric power generation voltage of the electric power generator available in a case where the electric power generator is performing the regenerative electric power generation without causing the regenerative control" is constant regardless of the traveling state of the vehicle.

In this aspect, the ECU controls the electric power generator so that the electric power generation voltage of the regenerative electric power generation during the deceleration of the vehicle on which the instrument affecting the traveling of the vehicle when the supplied electric power is unstable is mounted becomes lower than at least one of (i) the electric power generation voltage of the regenerative electric power generation not causing the regenerative control of the vehicle on which the instrument affecting the traveling of the vehicle when the supplied electric power is unstable is mounted, (ii) the electric power generation voltage of the regenerative electric power generation during the deceleration of the vehicle on which the instrument affecting the traveling of the vehicle when the supplied electric power is unstable is not mounted, and (iii) the electric power generation voltage of the regenerative electric power generation not causing the regenerative control of the vehicle on which the instrument affecting the traveling of the vehicle when the supplied electric power is unstable is not mounted.

In the aspect described above, the ECU (14) may be configured to control the electric power generator (11) so that an hourly increment in the electric power generation voltage of the electric power generator (11) is exceeded by a predetermined increment when the specific instrument is present and the electric power generator (11) is performing the regenerative electric power generation during the deceleration of the vehicle. The predetermined increment is the hourly increment in the electric power generation voltage of the electric power generator available when the specific instrument is absent and the electric power generator (11) is performing the regenerative electric power generation during the deceleration of the vehicle.

According to this aspect, the amount of the electric power generated by the regenerative electric power generation during the deceleration of the vehicle on which the instrument affecting the traveling of the vehicle when the supplied electric power is unstable is mounted is exceeded by the amount of the electric power generated by the regenerative electric power generation during the deceleration of the vehicle on which the instrument affecting the traveling of the vehicle when the supplied electric power is unstable is not mounted in the case of the same deceleration period. Accordingly, the charging electric power amount during the deceleration of the vehicle on which the instrument affecting the traveling of the vehicle when the supplied electric power is unstable is mounted can be relatively easily suppressed according to this aspect, which leads to significant practical advantages.

The "hourly increment in the electric power generation voltage" can also be expressed as, for example, the rate of increase or ratio of increase in the electric power generation voltage.

In the aspect described above, the ECU may be configured to control the electric power generator so that an electric power generation current of the electric power generator is exceeded by a predetermined electric power generation current when the specific instrument is present and the electric power generator is performing the regenerative electric power generation during the deceleration of the vehicle. The predetermined electric power generation current is the electric power generation current of the electric power generator available when the specific instrument is absent and the electric power generator is performing the regenerative electric power generation during the deceleration of the vehicle.

According to this aspect, the amount of the electric power generated by the regenerative electric power generation during the deceleration of the vehicle on which the instrument affecting the traveling of the vehicle when the supplied electric power is unstable is mounted is exceeded by the amount of the electric power generated by the regenerative electric power generation during the deceleration of the vehicle on which the instrument affecting the traveling of the vehicle when the supplied electric power is unstable is not mounted in the case of the same deceleration period. Accordingly, the charging electric power amount during the deceleration of the vehicle on which the instrument affecting the traveling of the vehicle when the supplied electric power is unstable is mounted can be relatively easily suppressed according to this aspect, which leads to significant practical advantages.

In the aspect described above, the first battery and the second battery may be different types of batteries. The first battery and the second battery may be electrically connected in parallel to each other. The electric power supply device may further include a switch. The switch may be configured to electrically disconnect one of the first battery and the second battery from the other one of the first battery and the second battery and the electric power generator.

First of all, the first battery and the second battery are electrically connected in parallel to each other according to this aspect, and thus electric power can be stably supplied to the instrument affecting the traveling of the vehicle when the supplied electric power is unstable. Accordingly, a stable operation of the instrument can be ensured.

In addition, the switch is capable of electrically disconnecting one of the first battery and the second battery from the other one of the first battery and the second battery and the electric power generator. Accordingly, the effect on the vehicle attributable to the degradation of one of the batteries can be avoided in a case where, for example, one of the batteries is degraded, which leads to significant practical advantages.

When one of the first battery and the second battery is, for example, a lithium-ion battery or a nickel-hydrogen battery and the other one of the first battery and the second battery is, for example, a lead battery, the first battery and the second battery have similar open-circuit voltage (OCV) characteristics, and thus the control of the electric power supply device becomes relatively easier and the electric power supply device can be configured at a relatively low cost, which leads to significant practical advantages.

In this aspect, one of the first battery and the second battery may be a lithium-ion battery or a nickel-hydrogen battery.

According to this configuration, for example, the volume and mass of one of the first battery and the second battery can be suppressed and the electric power supply device can be, for example, compact in size.

The effect and other advantages of the invention will be made apparent in the following description of embodiments.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments relating to an electric power supply device according to the invention will be described with reference to drawings.

A first embodiment relating to the electric power supply device according to the invention will be described with reference to FIGS. 1 to 4.

Figure 1:
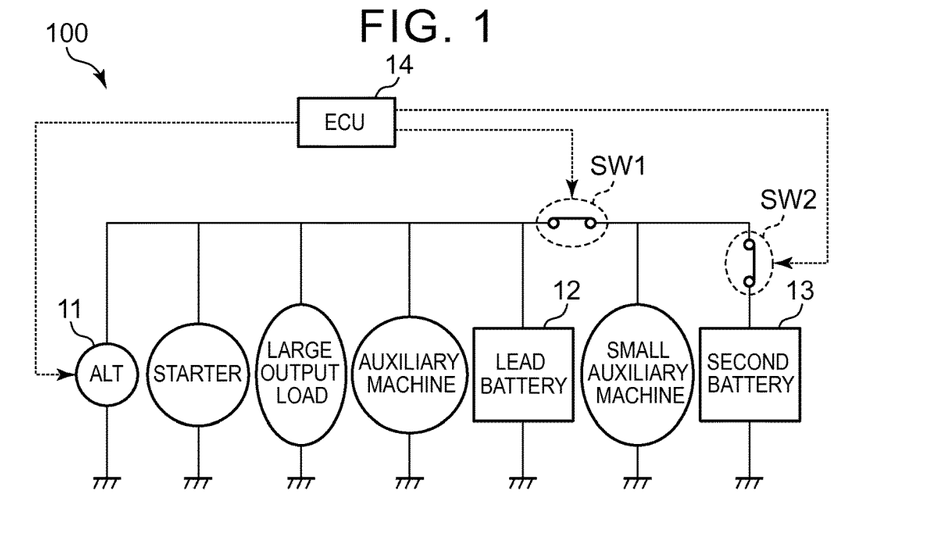
FIG. 1 is a schematic configuration diagram illustrating the overview of an electric power supply device according to a first embodiment.

Firstly, the configuration of the electric power supply device relating to the first embodiment will be described with reference to FIG. 1. FIG. 1 is a schematic configuration diagram illustrating the overview of the electric power supply device according to the first embodiment. The electric power supply device is mounted on a vehicle such as a car.

According to FIG. 1, an electric power supply device 100 is configured to be provided with an alternator 11, a lead battery 12, a second battery 13 that is a nickel-hydrogen battery or a lithium-ion battery, and an ECU 14.

Each of the lead battery 12 and the second battery 13 is configured to be chargeable by using electric power from regenerative electric power generation by the alternator 11. The alternator 11 may be configured as a motor generator in, for example, a hybrid vehicle.

The alternator 11, the lead battery 12, and the second battery 13 are electrically connected to a starter motor, a large output load such as an electric stabilizer, and auxiliary and small auxiliary machines such as a water pump, a wiper, and a light. Although the ECU 14 is also electrically connected to the alternator 11, the lead battery 12, and the second battery 13, the ECU 14 is illustrated as in FIG. 1 for convenience of description.

As illustrated in FIG. 1, the second battery 13 is electrically connected to the alternator 11 and the lead battery 12 via switches SW1, SW2. Each of the switches SW1, SW2 is controlled by the ECU 14.

Specifically, the ECU 14 changes the state of the switch SW2 to OFF in a case where, for example, the second battery 13 is over-discharged or over-charged or the second battery 13 is degraded. Alternatively, the ECU 14 changes the state of the switch SW1 to OFF and changes the state of the switch SW2 to ON in a case where, for example, the lead battery 12 fails so that the second battery 13 functions as a backup electric power supply for the small auxiliary machine. Typically, the ECU 14 maintains the ON state of the switches SW1, SW2 during vehicle traveling in the interest of stable electric power supply and fuel efficiency improvement.

The "large output load" relating to this embodiment is an example of an "instrument affecting the traveling of the vehicle when the supplied voltage is unstable" relating to this embodiment.

Hereinafter, electric power generator control that is implemented in the electric power supply device 100 which has the configuration described above will be described with reference to the flowchart in FIG. 2 and FIG. 3.

Figure 2:
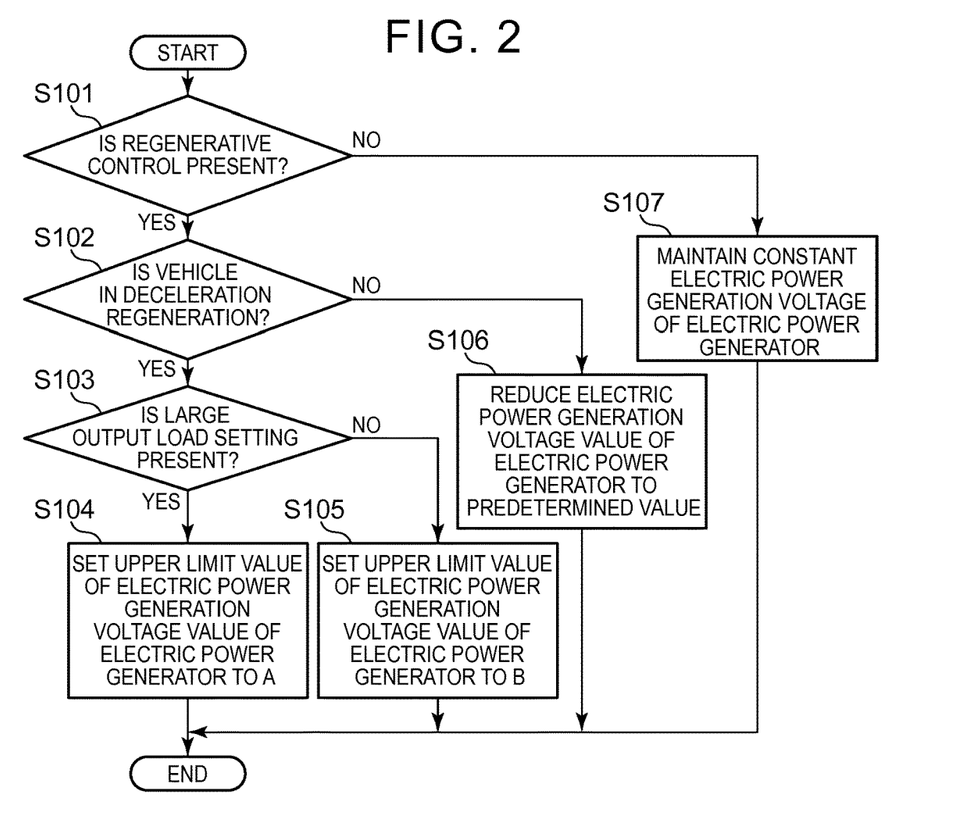
FIG. 2 is a flowchart illustrating electric power generator control according to the first embodiment.
Figure 3:
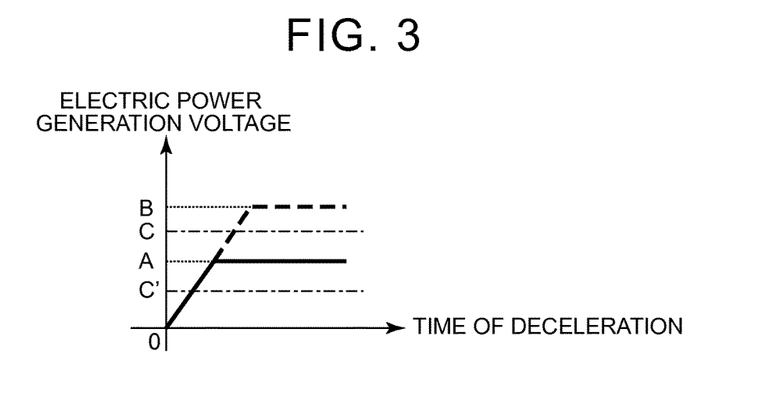
FIG. 3 is a diagram for showing an upper limit value of an electric power generation voltage during vehicle deceleration.

According to FIG. 2, the ECU 14 first determines the presence or absence of regenerative control (Step S101). "The presence or absence of the regenerative control" may be determined based on, for example, whether or not a regenerative control flag is ON or whether or not a program relating to the regenerative control is present.

In a case where it is determined that the regenerative control is present (Step S101: Yes), the ECU 14 determines (Step S102) whether or not the vehicle is decelerating and the alternator 11 is performing the regenerative electric power generation (hereinafter, appropriately referred to as "deceleration regeneration being in progress"). In a case where it is determined that the deceleration regeneration is in progress (Step S102: Yes), the ECU 14 determines the presence or absence of large output load setting (Step S103).

In a case where it is determined that the large output load setting is present (Step S103: Yes), the ECU 14 sets an upper limit value of an electric power generation voltage value of the alternator 11 to an electric power generation voltage A in FIG. 3 (Step S104). Herein, the "electric power generation voltage A" is set as a voltage that is lower than an electric power generation voltage at which the lead battery 12 and the second battery 13 can be charged appropriately and efficiently.

In a case where it is determined that the large output load setting is absent (Step S103: No), the ECU 14 sets the upper limit value of the electric power generation voltage value of the alternator 11 to an electric power generation voltage B in FIG. 3 (Step S105). Herein, the "electric power generation voltage B" is set as the electric power generation voltage at which the lead battery 12 and the second battery 13 can be charged appropriately and efficiently.

In a case where it is determined in the processing of Step S102 described above that the deceleration regeneration is not in progress (Step S102: No), the ECU 14 reduces the electric power generation voltage value of the alternator 11 to a predetermined value (Step S106). Specifically, the predetermined value is, for example, 12 V in a case where, for example, the electric power from the regenerative electric power generation by the alternator 11 needs to be supplied to the auxiliary machine or the like. The regenerative electric power generation by the alternator 11 is unnecessary and the predetermined value is, for example, 0 V in a case where, for example, the electric power used by the auxiliary machine or the like can be covered by the electric power output from the lead battery 12 and the second battery 13.

In a case where it is determined in the processing of Step S101 described above that the regenerative control is absent (Step S101: No), the ECU 14 maintains the electric power generation voltage of the alternator 11 at a constant value (Step S107). Herein, examples of the constant value include an electric power generation voltage C and an electric power generation voltage C' in FIG. 3. The constant value is appropriately set in accordance with the specifications of the electric power supply device 100.

Figure 4:
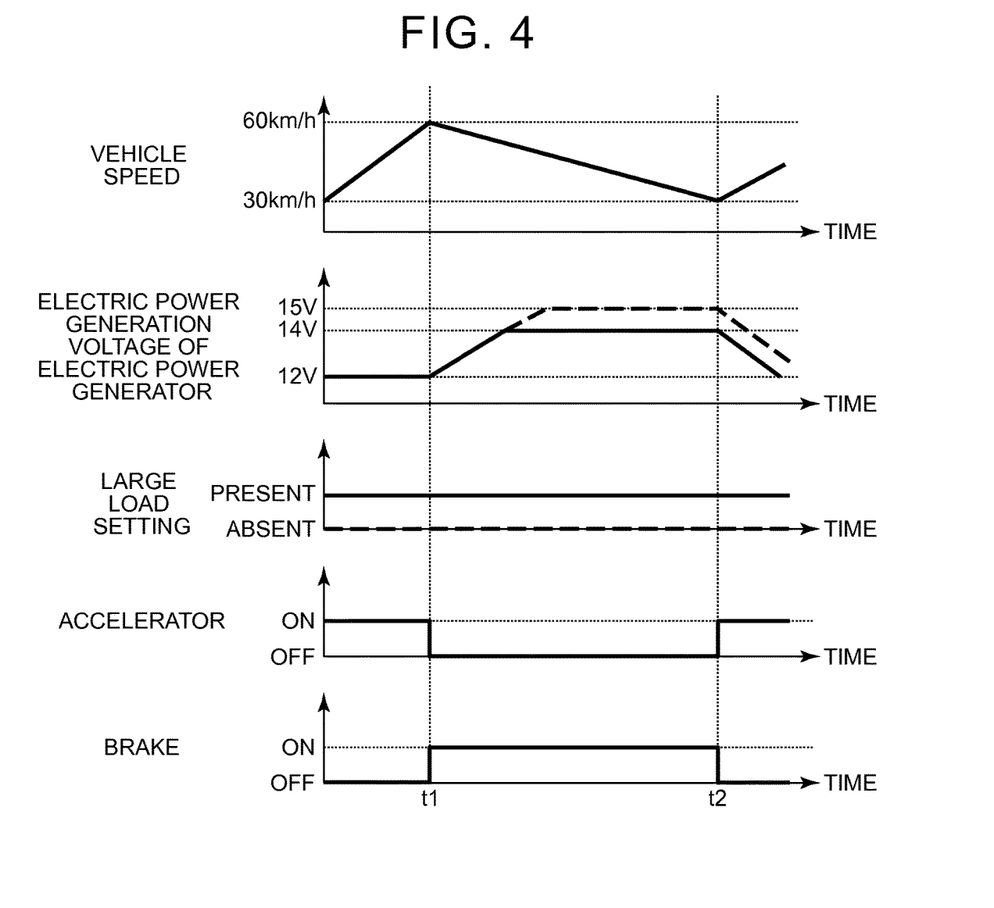
FIG. 4 is a time chart illustrating an example of a change in electric power generation voltage during vehicle traveling.

The electric power generator control described above will be further described with reference to the specific case illustrated in FIG. 4. FIG. 4 is a time chart illustrating an example of a change in electric power generation voltage during vehicle traveling. FIG. 4 assumes the presence of the regenerative control.

Until time t1 in FIG. 4, an accelerator pedal is depressed (accelerator ON) by a driver of the vehicle and the vehicle is in an acceleration state. In this case, the ECU 14 determines in the processing of Step S102 in FIG. 2 that the deceleration regeneration is not in progress and implements the processing of Step S106 (reducing the electric power generation voltage to 12 V, which is an example of the predetermined value).

At time t1, the vehicle begins to decelerate as the driver lifts his or her foot from the accelerator pedal (accelerator OFF) and depresses a brake pedal (brake ON). In this case, the ECU 14 determines in the processing of Step S102 in FIG. 2 that the deceleration regeneration is in progress and implements the processing of Step S103.

In a case where it is determined in the processing of Step S103 that the large output load setting is present (refer to the solid line in FIG. 4), the ECU 14 sets the upper limit value of the electric power generation voltage of the alternator 11 to 14 V. In this case, the ECU 14 gradually raises the electric power generation voltage of the alternator 11 so as to prevent an electrical component allowing no voltage change, such as the wiper and the light, from being affected.

Then, at time t2, the ECU 14 determines in the processing of Step S102 in FIG. 2 that the deceleration regeneration is not in progress and implements the processing of Step S106 as the driver lifts his or her foot from the brake pedal (brake OFF) and depresses the accelerator pedal (accelerator ON). Even in this case, the ECU 14 gradually lowers the electric power generation voltage of the alternator 11 so as to prevent the electrical component allowing no voltage change from being affected.

In a case where it is determined in the processing of Step S103 that the large output load setting is absent (refer to the dashed line in FIG. 4), the ECU 14 sets the upper limit value of the electric power generation voltage of the alternator 11 to 15 V.

As a result of the above, the charging electric power amounts of the lead battery 12 and the second battery 13 are suppressed in a case where the large output load setting is present (that is, a high-load instrument is present) and the deceleration regeneration is in progress according to the electric power supply device 100 of this embodiment. In particular, the degradation of the second battery 13 can be inhibited because it is possible to suppress the stress resulting from the charging of the second battery 13 which is a nickel-hydrogen battery or a lithium-ion battery.

The "alternator 11", the "lead battery 12", the "second battery 13", and the "ECU 14" relating to this embodiment are examples of the "electric power generator", "the other one of the first battery and the second battery", "one of the first battery and the second battery", and the "control means" relating to the invention, respectively.

The "electric power generation voltage A" and the "electric power generation voltage B" relating to this embodiment are examples of the "electric power generation voltage of the electric power generator pertaining to a case where an instrument is present and the electric power generator is performing the regenerative electric power generation during vehicle deceleration" and the "electric power generation voltage of the electric power generator pertaining to a case where no instrument is present and the electric power generator is performing the regenerative electric power generation during vehicle deceleration" relating to the invention, respectively. The "electric power generation voltage C (or C')" relating to this embodiment is an example of the "electric power generation voltage of the electric power generator pertaining to a case where an instrument is present and the electric power generator is performing regenerative electric power generation causing no regenerative control" and the "electric power generation voltage of the electric power generator pertaining to a case where no instrument is present and the electric power generator is performing regenerative electric power generation causing no regenerative control" relating to the invention.

A second embodiment relating to the electric power supply device according to the invention will be described with reference to FIGS. 5 and 6. The second embodiment is similar to the first embodiment described above with the only exception that part of the electric power generator control differs. Description of the parts common to the first and second embodiments will be omitted, the same reference numerals will be used to refer to the same parts in the drawings, and basically only the different parts will be described with reference to FIGS. 5 and 6.

Figure 5:
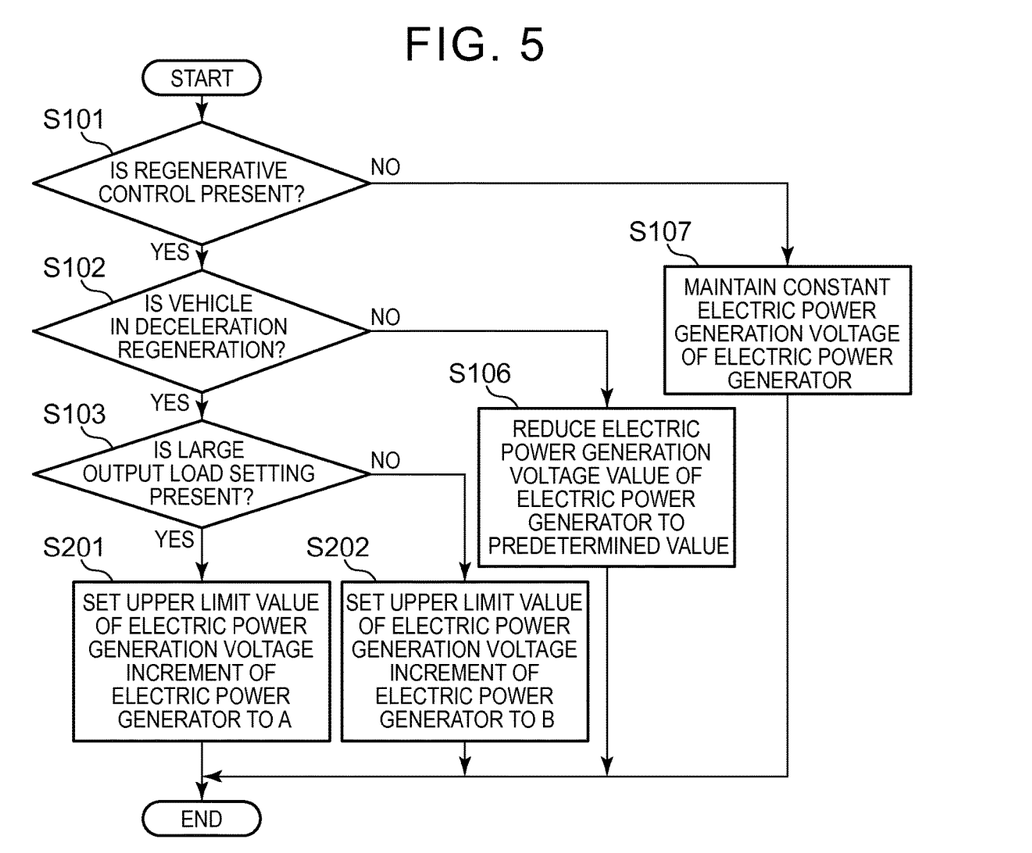
FIG. 5 is a flowchart illustrating electric power generator control according to a second embodiment.
Figure 6:
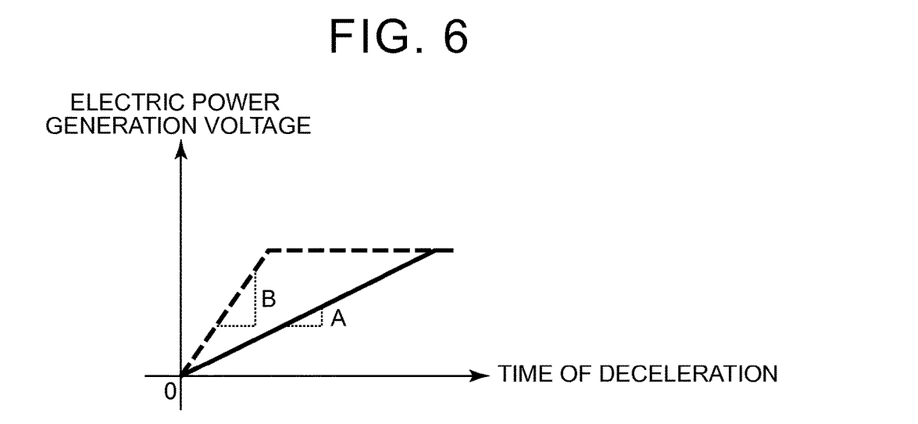
FIG. 6 is a diagram for showing an hourly increment in electric power generation voltage during vehicle deceleration.

According to FIG. 5, the ECU 14 sets an hourly increment in the electric power generation voltage of the alternator 11 to a slope A in FIG. 6 (Step S201) in a case where it is determined that the large output load setting is present (Step S103: Yes). Herein, the "slope A" is set as a slope that is gentler than a slope (that is, the hourly increment in the electric power generation voltage) at which the effect on the electrical component allowing no voltage change can be prevented or suppressed.

The ECU 14 sets the hourly increment in the electric power generation voltage of the alternator 11 to a slope B in FIG. 6 (Step S202) in a case where it is determined that the large output load setting is absent (Step S103: No). Herein, the "slope B" is set as the slope at which the effect on the electrical component allowing no voltage change can be prevented or suppressed.

As a result of the above, the charging electric power amounts of the lead battery 12 and the second battery 13 during the deceleration period are suppressed in a case where the large output load setting is present and the deceleration regeneration is in progress according to the electric power supply device 100 of this embodiment.

In addition, in the processing of Step S201 described above, the upper limit value of the electric power generation voltage may be reduced to be lower than the upper limit value of the electric power generation voltage pertaining to a case where it is determined that the large output load setting is absent.

A third embodiment relating to the electric power supply device according to the invention will be described with reference to FIGS. 7 and 8. The third embodiment is similar to the first embodiment described above with the only exception that part of the electric power generator control differs. Description of the parts common to the first and third embodiments will be omitted, the same reference numerals will be used to refer to the same parts in the drawings, and basically only the different parts will be described with reference to FIGS. 7 and 8.

Figure 7:
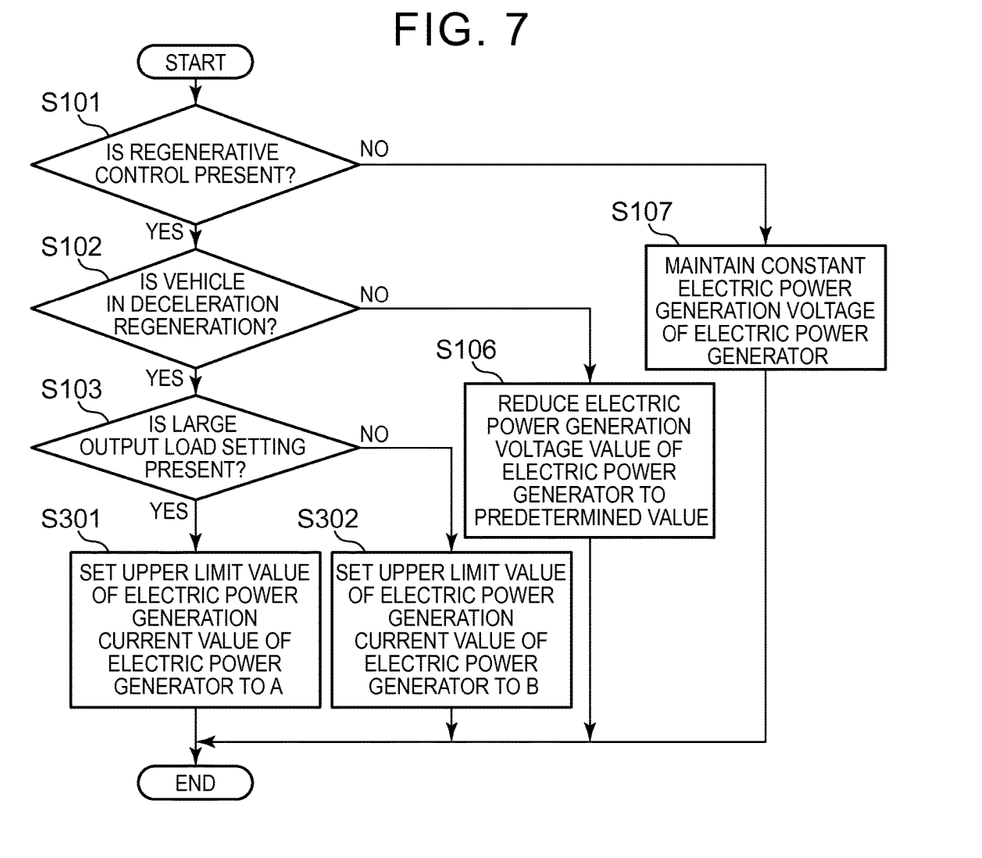
FIG. 7 is a flowchart illustrating electric power generator control according to a third embodiment.
Figure 8:
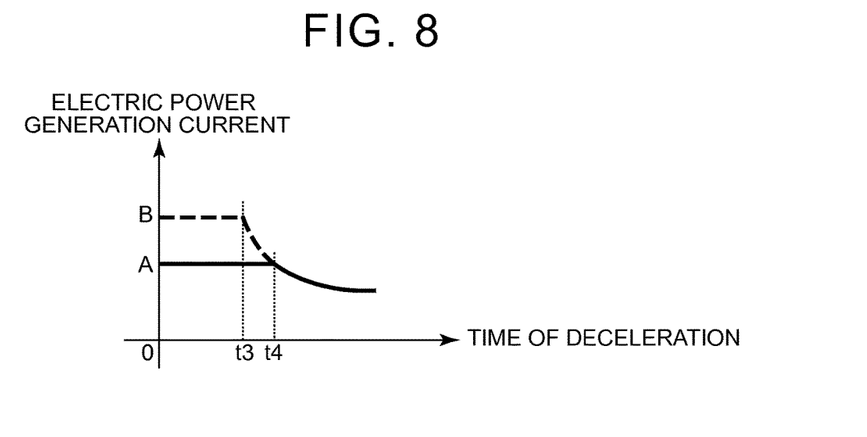
FIG. 8 is a diagram for showing an upper limit value of an electric power generation current during vehicle deceleration.

According to FIG. 7, the ECU 14 sets an upper limit value of an electric power generation current value of the alternator 11 to an electric power generation current A in FIG. 8 (Step S301) in a case where it is determined that the large output load setting is present (Step S103: Yes). Herein, the "electric power generation current A" is set as a current that is exceeded by an electric power generation current at which the lead battery 12 and the second battery 13 can be charged appropriately and efficiently.

The ECU 14 sets the upper limit value of the electric power generation current value of the alternator 11 to an electric power generation current B in FIG. 8 (Step S302) in a case where it is determined that the large output load setting is absent (Step S103: No). Herein, the "electric power generation current B" is set as the electric power generation current at which the lead battery 12 and the second battery 13 can be charged appropriately and efficiently.

The attenuation of the electric power generation current following time t3 (case where the upper limit value of the electric power generation current value is B) and time t4 (case where the upper limit value of the electric power generation current value is A) in FIG. 8 shows the state of current attenuation at the end of charging.

As a result of the above, the charging electric power amounts of the lead battery 12 and the second battery 13 during the deceleration period are suppressed in a case where the large output load setting is present and the deceleration regeneration is in progress according to the electric power supply device 100 of this embodiment.

A fourth embodiment relating to the electric power supply device according to the invention will be described with reference to FIG. 9. The fourth embodiment is similar to the first embodiment described above with the only exception that the lead battery and the second battery are electrically connected to each other by a different method. Description of the parts common to the first and fourth embodiments will be omitted, the same reference numerals will be used to refer to the same parts in the drawings, and basically only the different parts will be described with reference to FIG. 9.

Figure 9:
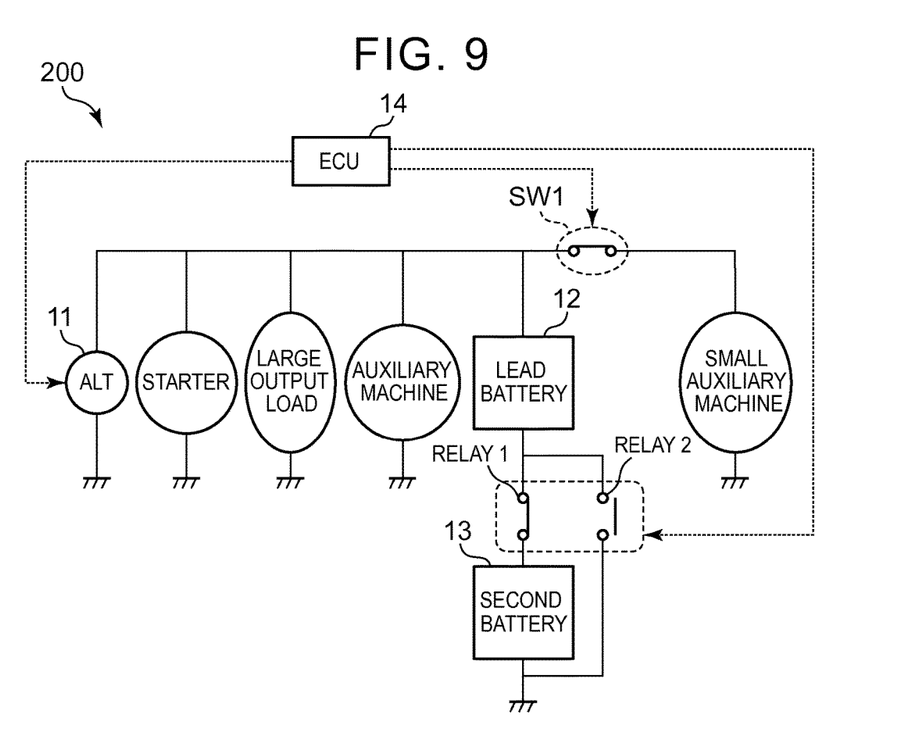
FIG. 9 is a schematic configuration diagram illustrating the overview of an electric power supply device according to a fourth embodiment.

In an electric power supply device 200 relating to this embodiment, the second battery 13 is electrically connected in series to the lead battery 12 via a relay circuit as illustrated in FIG. 9. The ECU 14 changes the state of a relay 1 of the relay circuit to OFF and changes the state of a relay 2 of the relay circuit to ON in a case where, for example, the second battery 13 is over-discharged or over-charged or the second battery 13 is degraded.

Any of the control relating to the first to third embodiments described above can be applied to the control of the alternator 11 relating to this embodiment.

A fifth embodiment relating to the electric power supply device according to the invention will be described with reference to FIGS. 10 to 12. The fifth embodiment is similar to the first embodiment described above with the only exception that part of the configuration of the electric power supply device differs. Description of the parts common to the first and fifth embodiments will be omitted, the same reference numerals will be used to refer to the same parts in the drawings, and basically only the different parts will be described with reference to FIGS. 10 to 12.

Firstly, the configuration of the electric power supply device according to the fifth embodiment will be described with reference to FIG. 10. FIG. 10 is a schematic configuration diagram illustrating the overview of the electric power supply device according to the fifth embodiment, which shares the same spirit as that in FIG. 1.

Figure 10:
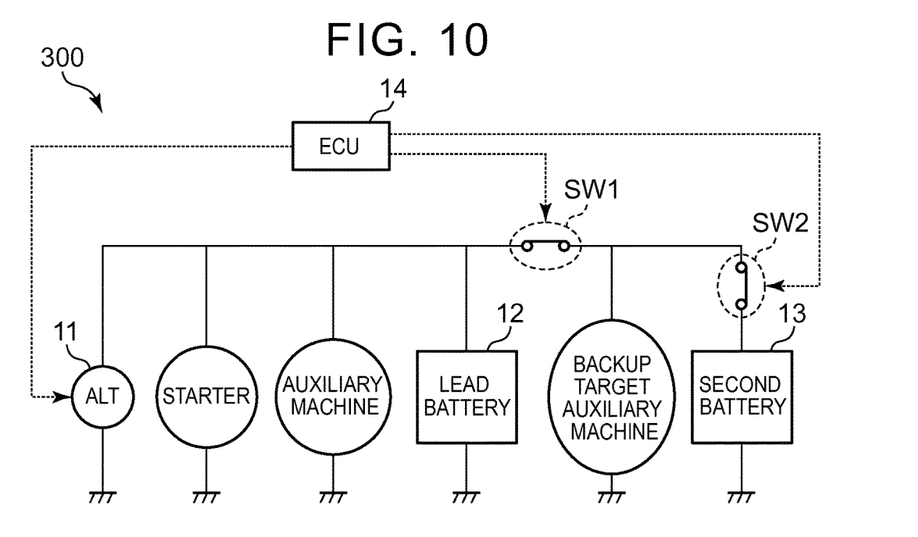
FIG. 10 is a schematic configuration diagram illustrating the overview of an electric power supply device according to a fifth embodiment.

According to FIG. 10, an electric power supply device 300 is configured to be provided with the alternator 11, the lead battery 12, the second battery 13 that is a nickel-hydrogen battery or a lithium-ion battery, and the ECU 14.

Each of the lead battery 12 and the second battery 13 is configured to be chargeable by using electric power from regenerative electric power generation by the alternator 11.

The alternator 11, the lead battery 12, and the second battery 13 are electrically connected to a starter motor, an auxiliary machine such as a water pump, a wiper, and a light, and a backup target auxiliary machine such as a by-wire system and an auto drive/drive assist system.

As illustrated in FIG. 10, the second battery 13 is electrically connected to the alternator 11 and the lead battery 12 via the switches SW1, SW2. Each of the switches SW1, SW2 is controlled by the ECU 14.

Specifically, the ECU 14 changes the state of the switch SW2 to OFF in a case where, for example, the second battery 13 is over-discharged or over-charged or the second battery 13 is degraded. Alternatively, the ECU 14 changes the state of the switch SW1 to OFF and changes the state of the switch SW2 to ON in a case where, for example, the lead battery 12 fails so that the second battery 13 functions as a backup electric power supply for the backup target auxiliary machine. Typically, the ECU 14 maintains the ON state of the switches SW1, SW2 during vehicle traveling in the interest of stable electric power supply and fuel efficiency improvement.

The "backup target auxiliary machine" relating to this embodiment is another example of the "instrument affecting the traveling of the vehicle when the supplied voltage is unstable" relating to this embodiment.

Hereinafter, electric power generator control that is implemented in the electric power supply device 300 which has the configuration described above will be described with reference to the flowchart in FIG. 11.

Figure 11:
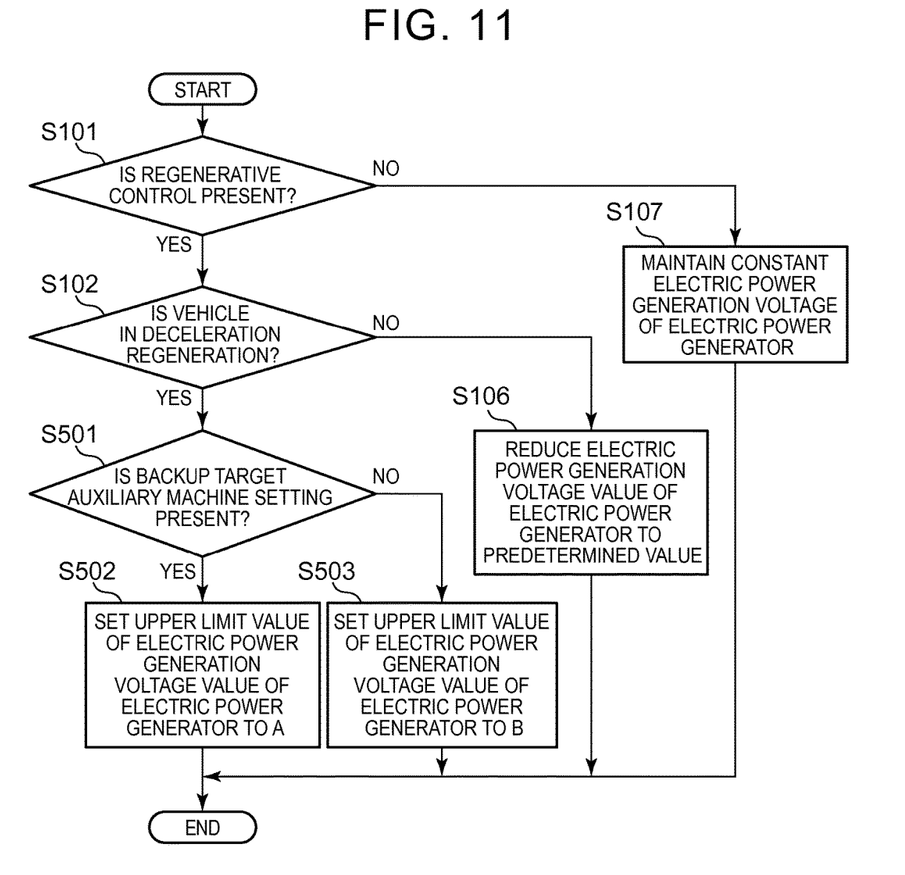
FIG. 11 is a flowchart illustrating electric power generator control according to the fifth embodiment.

According to FIG. 11, the ECU 14 determines the presence or absence of backup target auxiliary machine setting (Step S501) in a case where it is determined that the deceleration regeneration is in progress (Step S102: Yes). In a case where it is determined that the backup target auxiliary machine setting is present (Step S501: Yes), the ECU 14 sets the upper limit value of the electric power generation voltage value of the alternator 11 to, for example, the electric power generation voltage A in FIG. 3 (Step S502).

Herein, the "electric power generation voltage A" is, for example, 14.5 V and is set as a voltage that is lower than the electric power generation voltage at which the lead battery 12 and the second battery 13 can be charged appropriately and efficiently.

In a case where it is determined that the backup target auxiliary machine setting is absent (Step S501: No), the ECU 14 sets the upper limit value of the electric power generation voltage value of the alternator 11 to, for example, the electric power generation voltage B in FIG. 3 (Step S503). Herein, the "electric power generation voltage B" is, for example, 15 V and is set as the electric power generation voltage at which the lead battery 12 and the second battery 13 can be charged appropriately and efficiently.

In this embodiment, the "predetermined value" relating to the processing of Step S106 is, for example, 12 V and the "electric power generation voltage" in the processing of Step S107 is, for example, 14 V.

The electric power generator control described above will be further described with reference to the specific case illustrated in FIG. 12. FIG. 12 is a time chart illustrating another example of the change in electric power generation voltage during vehicle traveling, which shares the same spirit as that in FIG. 4. FIG. 12 assumes the presence of the regenerative control.

Figure 12:
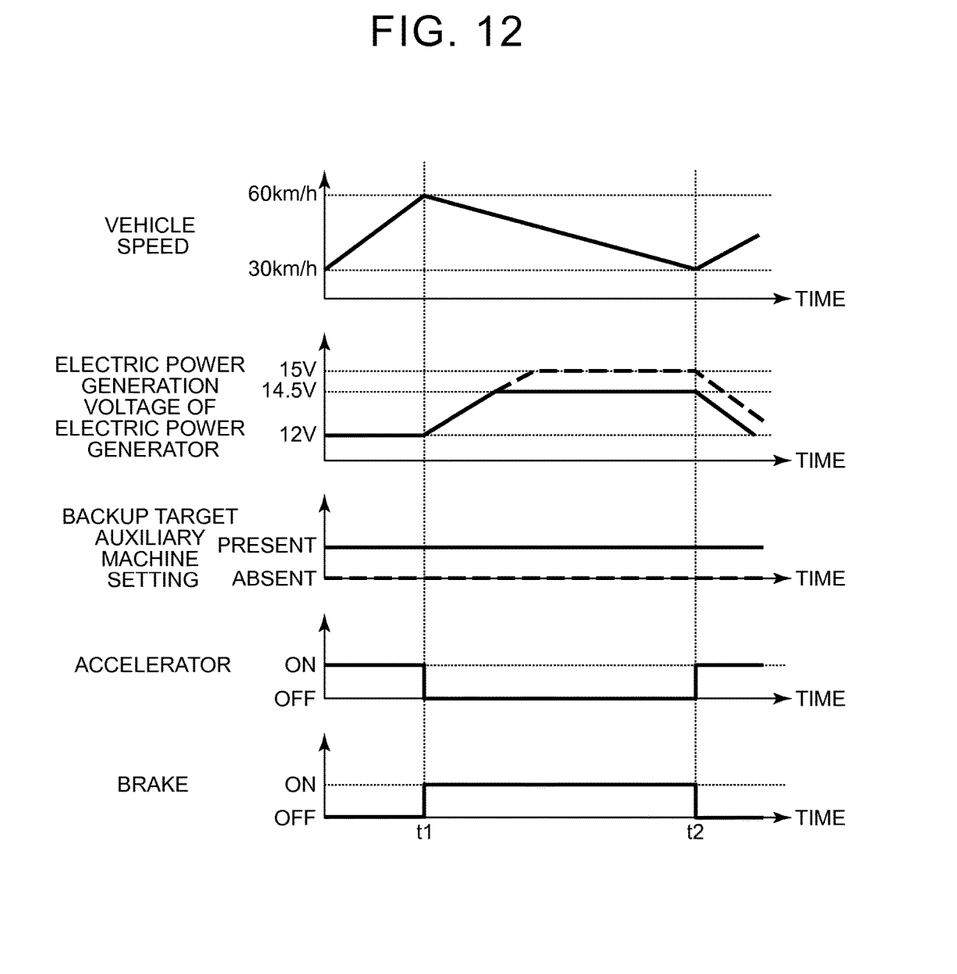
FIG. 12 is a time chart illustrating another example of the change in electric power generation voltage during vehicle traveling.

Until time t1 in FIG. 12, the accelerator pedal is depressed (accelerator ON) by the driver of the vehicle and the vehicle is in an acceleration state. In this case, the ECU 14 determines in the processing of Step S102 in FIG. 11 that the deceleration regeneration is not in progress and implements the processing of Step S106 (reducing the electric power generation voltage to 12 V, which is an example of the predetermined value).

At time t1, the vehicle begins to decelerate as the driver lifts his or her foot from the accelerator pedal (accelerator OFF) and depresses the brake pedal (brake ON). In this case, the ECU 14 determines in the processing of Step S102 in FIG. 11 that the deceleration regeneration is in progress and implements the processing of Step S501.

In a case where it is determined in the processing of Step S501 that the backup target auxiliary machine setting is present (refer to the solid line in FIG. 12), the ECU 14 sets the upper limit value of the electric power generation voltage of the alternator 11 to 14.5 V.

Then, at time t2, the ECU 14 determines in the processing of Step S102 in FIG. 11 that the deceleration regeneration is not in progress and implements the processing of Step S106 as the driver lifts his or her foot from the brake pedal (brake OFF) and depresses the accelerator pedal (accelerator ON).

In a case where it is determined in the processing of Step S501 that the backup target auxiliary machine setting is absent (refer to the dashed line in FIG. 12), the ECU 14 sets the upper limit value of the electric power generation voltage of the alternator 11 to 15 V.

As a result of the above, the charging electric power amounts of the lead battery 12 and the second battery 13 are suppressed in a case where the backup target auxiliary machine setting is present (that is, a backup target auxiliary machine is present) and the deceleration regeneration is in progress according to the electric power supply device 300 of this embodiment.

The degradation of the second battery 13 may be accelerated in a case where the lead battery 12 and the second battery 13 are connected to each other not via an electric power conversion device such as a DC/DC converter and the second battery 13 is used as an electric power supply for regeneration. Although it is possible to limit the regeneration amount in accordance with the degree of the degradation of the second battery 13 and ensure the service life of the second battery 13 to some extent, the fuel efficiency effect may be subjected to a significant decrease attributable to, for example, the limitation of the regeneration. Also, a user may be subjected to a relatively large cost burden when the second battery 13 needs to be replaced due to the degradation in a case where the second battery 13 is a nickel-hydrogen battery or a lithium-ion battery.

In this embodiment, the degradation of the second battery 13 can be inhibited since it is possible to suppress the stress resulting from the charging of the second battery 13. Accordingly, it is possible to ensure the reliability of the backup target auxiliary machine, which leads to significant practical advantages.

Even the electric power supply device 300 according to this embodiment can be one in which the lead battery 12 and the second battery 13 are connected to each other via a relay circuit as illustrated in FIG. 9.

A sixth embodiment relating to the electric power supply device according to the invention will be described with reference to FIG. 13. The sixth embodiment is similar to the fifth embodiment described above with the only exception that part of the electric power generator control differs. Description of the parts common to the fifth and sixth embodiments will be omitted, the same reference numerals will be used to refer to the same parts in the drawings, and basically only the different parts will be described with reference to FIG. 13.

Figure 13:
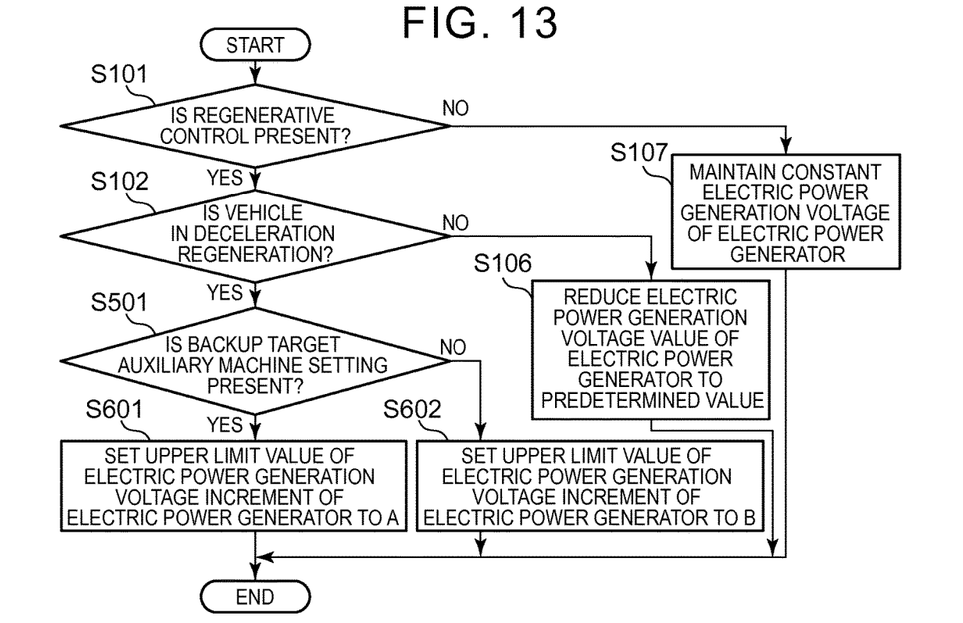
FIG. 13 is a flowchart illustrating electric power generator control according to a sixth embodiment.

According to FIG. 13, the ECU 14 sets the hourly increment in the electric power generation voltage of the alternator 11 to, for example, the slope A in FIG. 6 (Step S601) in a case where it is determined that the backup target auxiliary machine setting is present (Step S501: Yes).

In a case where it is determined that the backup target auxiliary machine setting is absent (Step S501: No), the ECU 14 sets the hourly increment in the electric power generation voltage of the alternator 11 to, for example, the slope B in FIG. 6 (Step S602).

As a result of the above, the charging electric power amounts of the lead battery 12 and the second battery 13 are suppressed in a case where the backup target auxiliary machine setting is present and the deceleration regeneration is in progress according to the electric power supply device 300 of this embodiment.

In addition, in the processing of Step S601 described above, the upper limit value of the electric power generation voltage may be reduced to be lower than the upper limit value of the electric power generation voltage pertaining to a case where it is determined that the backup target auxiliary machine setting is absent.

A seventh embodiment relating to the electric power supply device according to the invention will be described with reference to FIG. 14. The seventh embodiment is similar to the fifth embodiment described above with the only exception that part of the electric power generator control differs. Description of the parts common to the fifth and seventh embodiments will be omitted, the same reference numerals will be used to refer to the same parts in the drawings, and basically only the different parts will be described with reference to FIG. 14.

Figure 14:
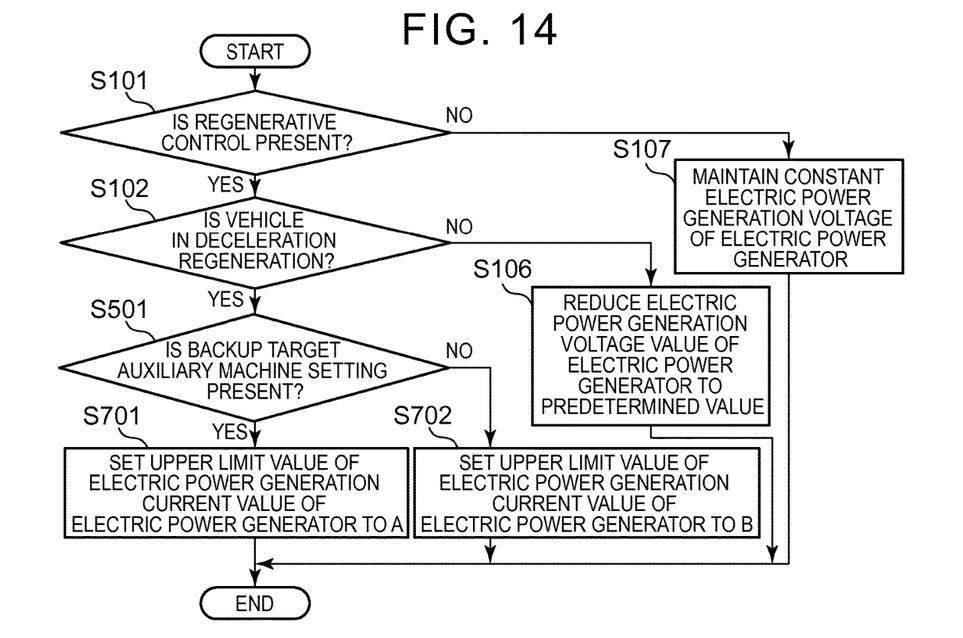
FIG. 14 is a flowchart illustrating electric power generator control according to a seventh embodiment.

According to FIG. 14, the ECU 14 sets the upper limit value of the electric power generation current value of the alternator 11 to, for example, the electric power generation current A in FIG. 8 (Step S701) in a case where it is determined that the backup target auxiliary machine setting is present (Step S501: Yes).

In a case where it is determined that the backup target auxiliary machine setting is absent (Step S501: No), the ECU 14 sets the upper limit value of the electric power generation current value of the alternator 11 to, for example, the electric power generation current B in FIG. 8 (Step S702).

As a result of the above, the charging electric power amounts of the lead battery 12 and the second battery 13 during the deceleration period are suppressed in a case where the backup target auxiliary machine setting is present and the deceleration regeneration is in progress according to the electric power supply device 300 of this embodiment.

The electric power supply device relating to the first to fourth embodiments may further include the backup target auxiliary machine. The electric power supply device relating to the fifth to seventh embodiments may further include the large output load.

In this case, "whether or not the large output load setting or the backup target auxiliary machine setting is present" may be determined in, for example, the processing of Step S103 in FIG. 2, the processing of Step S104 may be implemented in a case where it is determined that the "large output load setting or the backup target auxiliary machine setting is present", and the processing of Step S105 may be implemented in a case where it is determined that both of the "large output load setting and the backup target auxiliary machine setting are absent".

The invention is not limited to the embodiments described above. The invention can be appropriately modified without departing from the spirit of the invention that can be read in the claims and in the entire specification. Electric power supply devices resulting from such modifications are also included in the technical scope of the invention.

What is claimed is:

1. An electric power supply device for a vehicle, a plurality of load instruments being mounted on the vehicle, the electric power supply device comprising:
   a first battery;
   a second battery, the first battery and the second battery being configured to supply electric power to the load instruments;
   an electric power generator configured to charge the first battery and the second battery by regenerative electric power generation for converting kinetic energy into electric energy; and
   an electronic control unit (ECU) configured to
   control the electric power generator so that a charging electric power amount of at least one of the first battery and the second battery based on the regenerative electric power generation is suppressed when a specific instrument is present among the plurality of load instruments and the electric power generator is performing the regenerative electric power generation during deceleration of the vehicle, the specific instrument being an instrument affecting traveling of the vehicle when a supplied voltage is unstable,
   wherein the ECU is further configured to:
   control an electric power generation voltage of the electric power generator to be lower than at least one of a first electric power generation voltage, a second electric power generation voltage, and a third electric power generation voltage,
   wherein the first electric power generation voltage is the electric power generation voltage of the electric power generator available when the specific instrument is present and the electric power generator is performing the regenerative electric power generation during deceleration of the vehicle,
   wherein the second electric power generation voltage is the electric power generation voltage of the electric power generator available when the specific instrument is absent and the electric power generator is performing the regenerative electric power generation during deceleration of the vehicle, and
   wherein the third electric power generation voltage is the electric power generation voltage of the electric power generator available when the specific instrument is absent and the electric power generator is performing the regenerative electric power generation without deceleration of the vehicle.

2. The electric power supply device according to claim 1 wherein the specific instrument is a backup target instrument, the backup target instrument being an instrument requiring support for stabilizing the voltage supplied to the instrument.

3. The electric power supply device according to claim 1 wherein the ECU is configured to control the electric power generator so that an hourly increment in the electric power generation voltage of the electric power generator is exceeded by a predetermined increment when the specific instrument is present and the electric power generator is performing the regenerative electric power generation during the deceleration of the vehicle, the predetermined increment being the hourly increment in the electric power generation voltage of the electric power generator available when the specific instrument is absent and the electric power generator is performing the regenerative electric power generation during the deceleration of the vehicle.

4. The electric power supply device according to claim 1 wherein the ECU is configured to control the electric power generator so that an electric power generation current of the electric power generator is exceeded by a predetermined electric power generation current when the specific instrument is present and the electric power generator is performing the regenerative electric power generation during the deceleration of the vehicle, the predetermined electric power generation current being the electric power generation current of the electric power generator available when the specific instrument is absent and the electric power generator is performing the regenerative electric power generation during the deceleration of the vehicle.

5. The electric power supply device according to claim 1 wherein the first battery and the second battery are different types of batteries,
   the first battery and the second battery are electrically connected in parallel to each other, and
   the electric power supply device further comprising:
   a switch configured to electrically disconnect one of the first battery and the second battery from the other one of the first battery and the second battery and the electric power generator.

6. The electric power supply device according to claim 5 wherein one of the first battery and the second battery is a lithium-ion battery or a nickel-hydrogen battery.

7. An electric power supply device for a vehicle, a plurality of load instruments being mounted on the vehicle, the electric power supply device comprising:
   a first battery;
   a second battery, the first battery and the second battery being configured to supply electric power to the load instruments;
   an electric power generator configured to charge the first battery and the second battery by regenerative electric power generation for converting kinetic energy into electric energy; and
   an electronic control unit (ECU) configured to:
   determine whether the electric power generator is performing the regenerative electric power generation during deceleration of the vehicle;
   determine whether a specific instrument among the plurality of load instruments is an instrument affecting traveling of the vehicle when a supplied voltage is unstable;
   based upon a condition that (i) the electric power generator is determined to be performing the regenerative electric power generation during deceleration of the vehicle and (ii) the specific instrument is an instrument affecting traveling of the vehicle when a supplied voltage is unstable, control the electric power generator so that a charging electric power amount of at least one of the first battery and the second battery based on the regenerative electric power generation is suppressed,
   wherein the ECU is further configured to:
   control an electric power generation voltage of the electric power generator to be lower than at least one of a first electric power generation voltage, a second electric power generation voltage, and a third electric power generation voltage, wherein the first electric power generation voltage is the electric power generation voltage of the electric power generator available when the specific instrument is present and the electric power generator is performing the regenerative electric power generation during deceleration of the vehicle, wherein the second electric power generation voltage is the electric power generation voltage of the electric power generator available when the specific instrument is absent and the electric power generator is performing the regenerative electric power generation during deceleration of the vehicle, and wherein the third electric power generation voltage is the electric power generation voltage of the electric power generator available when the specific instrument is absent and the electric power generator is performing the regenerative electric power generation without deceleration of the vehicle.

\* \* \* \* \*